(12) United States Patent
Bito et al.

(10) Patent No.: US 11,157,142 B2
(45) Date of Patent: Oct. 26, 2021

(54) DOCUMENT PROCESSING APPARATUS AND NON-TRANSITORY COMPUTER READABLE MEDIUM

(71) Applicant: FUJIFLIM Business Innovation Corp., Tokyo (JP)

(72) Inventors: Koji Bito, Kanagawa (JP); Taro Yoshihama, Kanagawa (JP); Yohei Uchiumi, Kanagawa (JP); Naoto Kashiwagi, Kanagawa (JP); Kosuke Kikushima, Kanagawa (JP)

(73) Assignee: FUJIFLIM Business Innovation Corp., Tokyo (JP)

( * ) Notice: Subject to any disclaimer, the term of this patent is extended or adjusted under 35 U.S.C. 154(b) by 159 days.

(21) Appl. No.: 16/163,572

(22) Filed: Oct. 18, 2018

(65) Prior Publication Data

US 2019/0129581 A1 May 2, 2019

(30) Foreign Application Priority Data

Oct. 27, 2017 (JP) .............................. JP2017-208310

(51) Int. Cl.
*G06F 3/0482* (2013.01)
*G06F 40/169* (2020.01)
(Continued)

(52) U.S. Cl.
CPC .......... *G06F 3/0482* (2013.01); *G06F 40/169* (2020.01); *G06F 3/0483* (2013.01);
(Continued)

(58) Field of Classification Search
CPC .. G06F 40/106; G06F 40/169; G06F 3/04812; G06F 3/0483; G06F 17/212; G06F 17/241; G06F 3/0482; G06F 3/04817
See application file for complete search history.

(56) References Cited

U.S. PATENT DOCUMENTS

2013/0271791 A1* 10/2013 Miyazaki .............. G06F 3/1285
358/2.1
2017/0357426 A1* 12/2017 Wilson .................... G06F 3/016
(Continued)

FOREIGN PATENT DOCUMENTS

JP H10187669 7/1998
JP 2006155528 6/2006

OTHER PUBLICATIONS

Fuji Xerox Co., Ltd., "DocuWorks 8," Available at: <http://www.fujixerox.co.jp/product/catalog/pdf/docuworks8_1307_7.pdf>, retrieved on Apr. 6, 2018.
(Continued)

*Primary Examiner* — Quoc A Tran
(74) *Attorney, Agent, or Firm* — JCIPRNET

(57) ABSTRACT

A document processing apparatus includes a display controller and a button update unit. The display controller performs, in a document processing application that is capable of adding multiple types of objects to an electronic document to be processed, control such that a display screen is displayed, the display screen including multiple recent instruction input buttons that are allocated multiple object adding instructions for adding an object to the electronic document, the multiple object adding instructions having been recently received from a user; and a button update unit that performs button update processing for updating an object adding instruction allocated to one of the multiple recent instruction input buttons to a newly received object adding instruction. In a case where it is determined that object adding instructions for adding a same type of objects to the electronic document to be processed are received consecutively, the button update unit does not perform the button update processing.

6 Claims, 8 Drawing Sheets

(51) Int. Cl.
*G06F 3/0481* (2013.01)
*G06F 40/106* (2020.01)
*G06F 3/0483* (2013.01)
*G06F 17/00* (2019.01)

(52) U.S. Cl.
CPC ...... *G06F 3/04812* (2013.01); *G06F 3/04817* (2013.01); *G06F 40/106* (2020.01)

(56) References Cited

U.S. PATENT DOCUMENTS

2017/0374259 A1* 12/2017 Nakamura ........... H04N 5/2353
2018/0004750 A1* 1/2018 Mochizuki ........ G06F 16/24578

OTHER PUBLICATIONS

"Office Action of Japan Counterpart Application", dated Aug. 24, 2021, with English translation thereof, p. 1-p. 5.

* cited by examiner

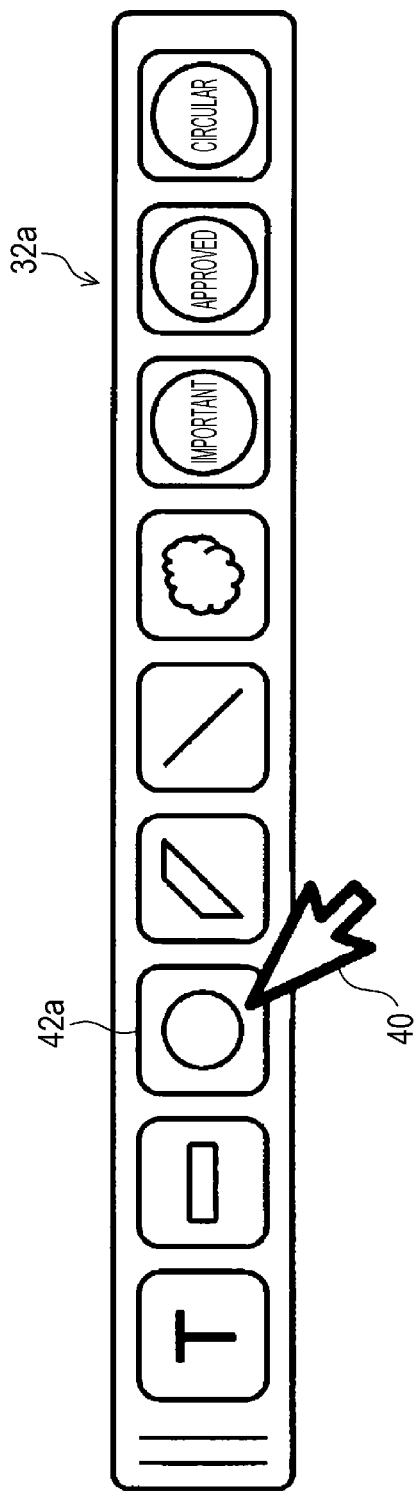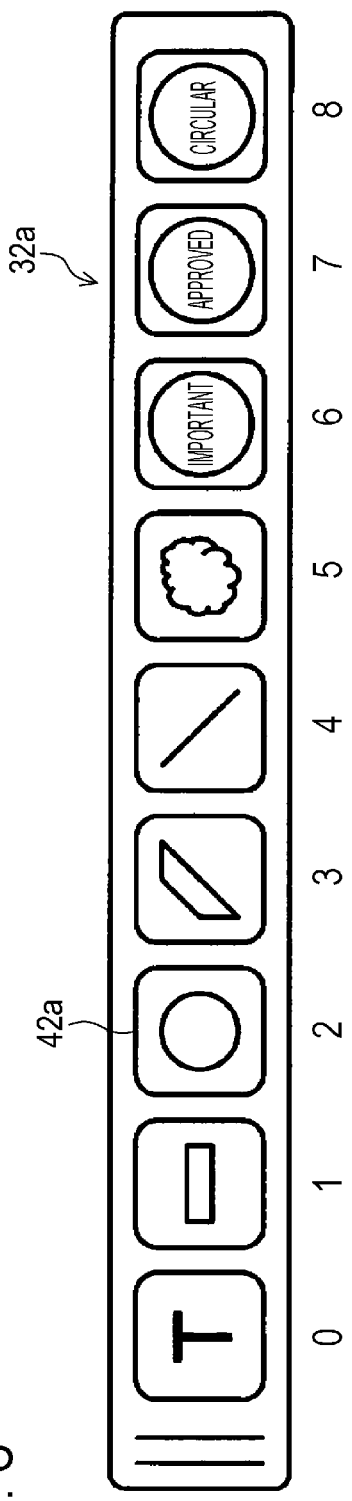
FIG. 5
FIG. 6

DOCUMENT PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-208310 filed Oct. 27, 2017.

BACKGROUND

(i) Technical Field

The present disclosure relates to a document processing apparatus and a non-transitory computer readable medium.

(ii) Related Art

Various document processing applications for performing processing (editing, management, and the like) on electronic documents have been known. For example, a document processing application that is capable of performing processing on electronic documents as if actual paper documents arranged on a desk were handled, is disclosed in DocuWorks 8, Fuji Xerox, "http://www.fujixerox.co.jp/product/catalog/pdf/docuworks8_1307_7.pdf".

SUMMARY

Some document processing applications are capable of adding an object to an electronic document to be processed. Normally, such document processing applications are capable of adding many types of objects. Users are able to add an object to an electronic document to be processed, by performing an operation for selecting a type of object to be added and specifying a position to which the object is to be added.

Even in the case where a document processing application is capable of adding many types of objects to an electronic document to be processed, processing for repeatedly adding only limited types (one to several types) of objects among the many types of objects is often performed. Based on the assumption that such processing is performed, to simplify an operation by a user, causing a button that is allocated an object adding instruction that has been recently received from a user (hereinafter, such a button will be referred to as a "recent instruction input button") to be displayed on a display screen of the document processing application is considered. In particular, based on the assumption that a plurality of types of objects are repeatedly added, it is preferable to display a plurality of recent instruction input buttons that are allocated a plurality of types of object adding instructions that have been recently received from a user.

In the case where the plurality of recent instruction input buttons are displayed, when a new object adding instruction is received from the user, an object adding instruction that is allocated to one of the plurality of recent instruction input buttons (normally, a recent instruction input button that is allocated the oldest object adding instruction input among the plurality of recent instruction input buttons) is updated to the newly received object adding instruction.

If a plurality of recent instruction input buttons that are allocated a plurality of types of object adding instructions are displayed, a user is able to easily perform an operation for selecting and adding a desired object from among the plurality of types of recently input objects. However, in the case where object adding instructions for adding the same type of objects are received consecutively, the plurality of object adding instructions that are allocated to the plurality of recent instruction input buttons are the same. That is, the plurality of object adding instructions that are allocated to the plurality of recent instruction input buttons are object adding instructions for adding the same type of objects. In this case, the user is not able to easily perform an operation for selecting and adding a desired object from among the plurality of types of recently input objects.

Aspects of non-limiting embodiments of the present disclosure relate to avoid a plurality of object adding instructions that are allocated to a plurality of recent instruction input buttons displayed on a display screen of a document processing application from being object adding instructions for adding the same type of objects.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a document processing apparatus including a display controller and a button update unit. The display controller performs, in a document processing application that is capable of adding a plurality of types of objects to an electronic document to be processed, control such that a display screen is displayed, the display screen including a plurality of recent instruction input buttons that are allocated a plurality of object adding instructions for adding an object to the electronic document, the plurality of object adding instructions having been recently received from a user; and a button update unit that performs button update processing for updating an object adding instruction allocated to one of the plurality of recent instruction input buttons to a newly received object adding instruction. In a case where it is determined that object adding instructions for adding a same type of objects to the electronic document to be processed are received consecutively, the button update unit does not perform the button update processing.

BRIEF DESCRIPTION OF THE DRAWINGS

Exemplary embodiments of the present disclosure will be described in detail based on the following figures, wherein:

FIG. 5 is a diagram illustrating the details of an annotation tool bar;

FIG. 6 is a diagram illustrating numbers allocated to buttons included in an annotation tool bar;

DETAILED DESCRIPTION

Exemplary embodiments of the present disclosure will be explained below.

Figure 1:
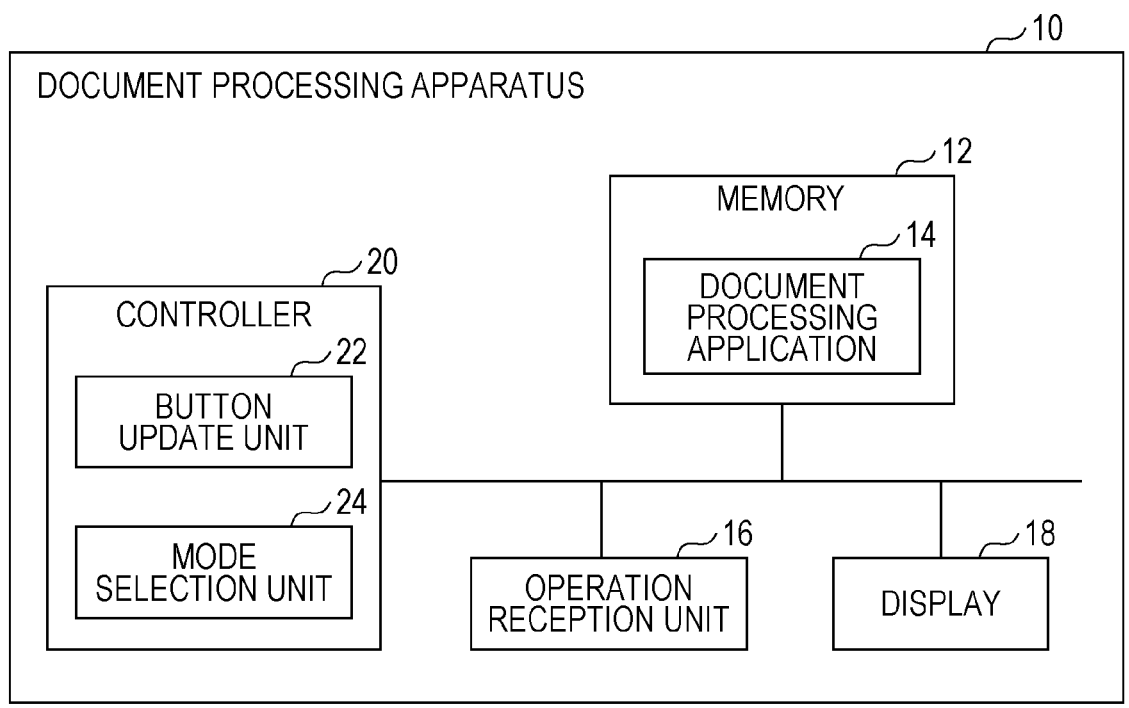
FIG. 1 is a configuration schematic diagram of a document processing apparatus according to an exemplary embodiment.

FIG. 1 is a configuration schematic diagram of a document processing apparatus 10 according to an exemplary embodiment. The document processing apparatus 10 in this exemplary embodiment is a personal computer. However, a portable terminal such as a tablet terminal or the like may be used as the document processing apparatus 10.

A memory 12 includes, for example, a hard disk, a read only memory (ROM), a random access memory (RAM), or the like. An electronic document to be processed by the information presentation apparatus 10, a processing result of the document processing apparatus 10, and the like are stored in the memory 12. Furthermore, a document processing application 14 that performs processing on an electronic document is installed into the document processing apparatus 10, and the document processing application 14 is thus stored in the memory 12. The details of the document processing application 14 will be described later. Furthermore, a document processing program for executing the document processing application 14 and causing each unit of the document processing apparatus 10 to operate is also stored in the memory 12.

An operation reception unit 16 includes, for example, a mouse, a keyboard, or the like. In the case where the document processing apparatus 10 is a tablet terminal, the document processing apparatus 10 may include a touch panel as the operation reception unit 16. The operation reception unit 16 receives an instruction to the document processing apparatus 10 from a user, in particular, an operation for inputting an instruction to the document processing application 14.

A display 18 includes, for example, a liquid crystal panel or the like. The display 18 displays various screens, in particular, a display screen of the document processing application 14.

A controller 20 includes, for example, a central processing unit (CPU) and the like. The controller 20 controls each unit of the document processing apparatus 10 in accordance with the document processing program stored in the memory 12. In particular, the controller 20 causes various display screens of the document processing application 14 to be displayed on the display 18. Therefore, the controller 20 also functions as a display controller. Furthermore, when executing the installed document processing application 14, the controller 20 also implements a function as a button update unit 22 and a mode selection unit 24.

The button update unit 22 performs processing for updating an instruction that is allocated to a recent instruction input button (details will be described later) included in the display screen of the document processing application 14. The mode selection unit 24 selects an operation mode of the document processing application 14 in accordance with an instruction from a user. Specifically, the mode selection unit 24 selects a mode for adding an object to an electronic document to be processed. The details of processing performed by the button update unit 22 and the mode selection unit 24 will be described later.

The details of the document processing application 14 and the details of processing performed by the button update unit 22 and the mode selection unit 24 will be explained below.

Figure 2:
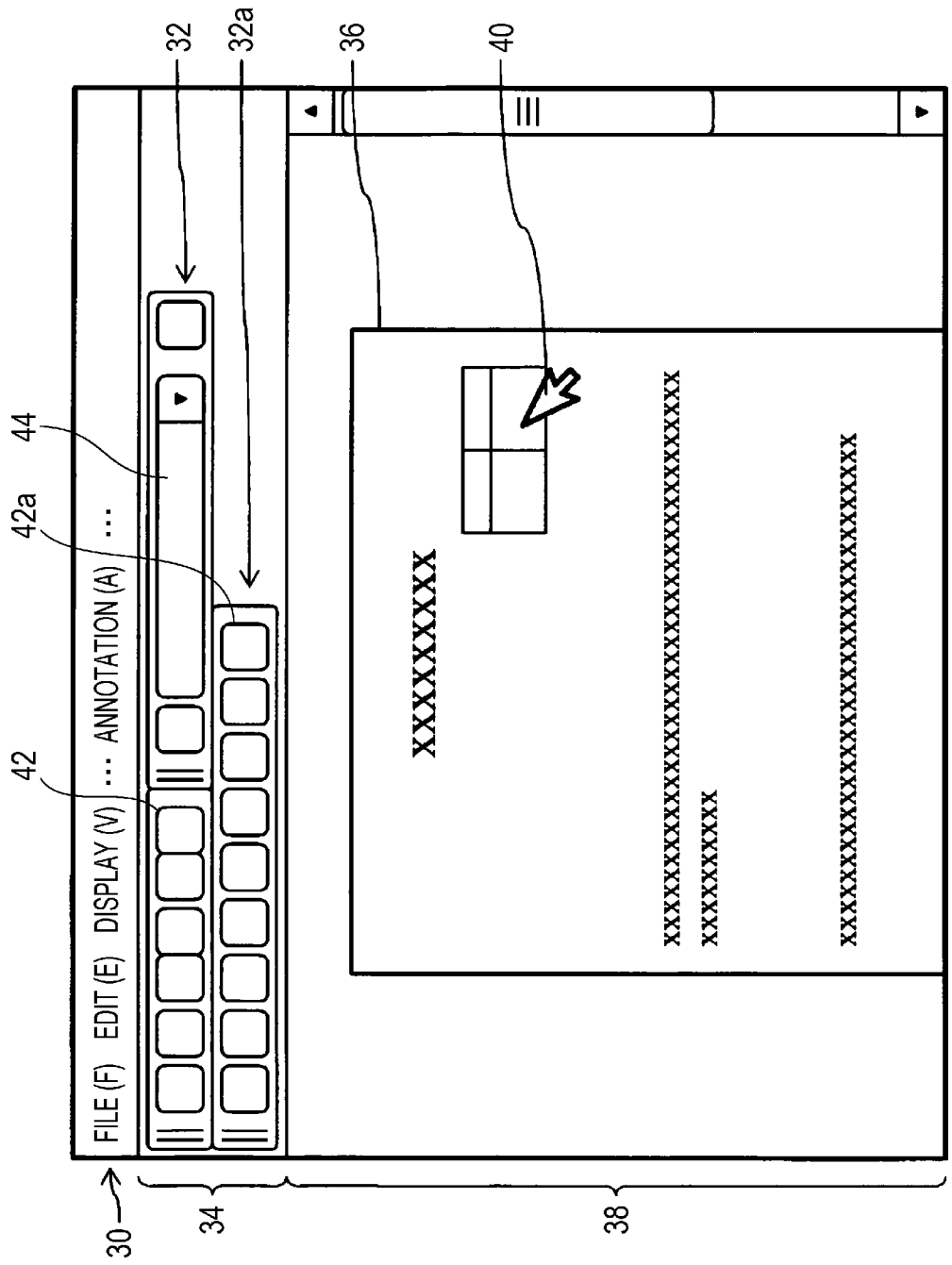
FIG. 2 is a diagram illustrating an example of a display screen of a document processing application according to an exemplary embodiment.

FIG. 2 is a diagram illustrating an example of a display screen of the document processing application 14 displayed on the display 18 (hereinafter, simply referred to as a "display screen"). The display screen includes a menu bar 30, a tool bar region 34 in which one or more tool bars 32 are displayed, and a document display region 38 in which an electronic document 36 to be processed is displayed. The display screen may include, for example, a folder region in which a folder tree of the document processing apparatus 10 is displayed, in addition to the regions described above. Furthermore, the size of each region may be changed by a user.

A cursor 40 that moves on the screen in accordance with an operation on the operation reception unit 16 by a user is displayed on the display screen. Specifically, the position of the cursor 40 is changed by an operation on a mouse as the operation reception unit 16 or a drag operation or tap operation using a finger of a user or a stylus on a touch panel as the operation reception unit 16 in the case where the document processing apparatus 10 is a tablet terminal.

The menu bar 30 includes a main menu including large items such as "file", "edit", "display", and the like. When a user places the cursor 40 on one of the large items to select the large item (this is achieved by, for example, a left-clicking operation or tap operation on a mouse), detailed instructions are displayed as a drop-down list. When selecting one of the displayed detailed instructions, the user is able to input the instruction to the document processing application 14.

Each of the tool bars 32 is a band-shape region including buttons 42 that are each provided with an icon and allocated an instruction that may be received by the document processing application 14, an attribute input box 44 to which an attribute (for example, the font of a character) of an annotation, which will be described later, as an object to be added to the electronic document 36 is input, or the like. For example, each of the tool bars 32 is provided in association with a large item of the menu bar 30. That is, each button 42 included in a single tool bar 32 is allocated a corresponding instruction included in a single large item. For example, the tool bar 32 corresponding to a large item "file" includes buttons 42 corresponding to "open a file (electronic document)", "save", and the like, which are instructions that may be selected from the large item "file". Alternatively, the tool bar 32 including a plurality of buttons 42 that are allocated a plurality of instructions selected from a plurality of large items by a user may be displayed.

The plurality of tool bars 32 displayed in the tool bar region 34 include an annotation tool bar 32a to be used for adding a plurality of types of annotations to the electronic document 36. An annotation is an object to be added to the electronic document 36. With the document processing application 14, the electronic document 36 may be processed as a layer structure including a plurality of layers. For example, an electronic document body is arranged in a layer 1, and an annotation to be added by the document processing application 14 is arranged in a layer 2, which is a layer different from that for the electronic document body. Therefore, an annotation may be regarded as an object to be arranged (added) in a layer different from that for an electronic document body.

The annotation tool bar 32a includes annotation addition buttons 42a that are each allocated an annotation adding instruction as an object adding instruction for adding an annotation to the electronic document 36. The annotation tool bar 32a includes a plurality of annotation addition buttons 42a. Annotation adding instructions for adding different types of annotations are allocated to the annotation addition buttons 42a. Although not illustrated in FIG. 2, icons (designs) indicating corresponding annotations are added to the annotation addition buttons 42a.

Types of annotations include, for example, text annotations, graphic annotations, stamp annotations, marker annotations, label annotations, and the like. Furthermore, graphic annotations include various types such as a rectangular shape, a circular shape, a linear shape, a cloud shape, and the like, and stamp annotations include various types such as important, approved, circular, confidential, examined, completed, and the like.

By selecting any one of the annotation addition buttons 42a included in the annotation tool bar 32a and specifying, using the cursor 40, a position to which a corresponding annotation is to be added in the document display region 38, a user is able to add the corresponding annotation at the specified position. Accordingly, the document processing application 14 is able to add a plurality of types of annotations to the electronic document 36.

Figure 3:
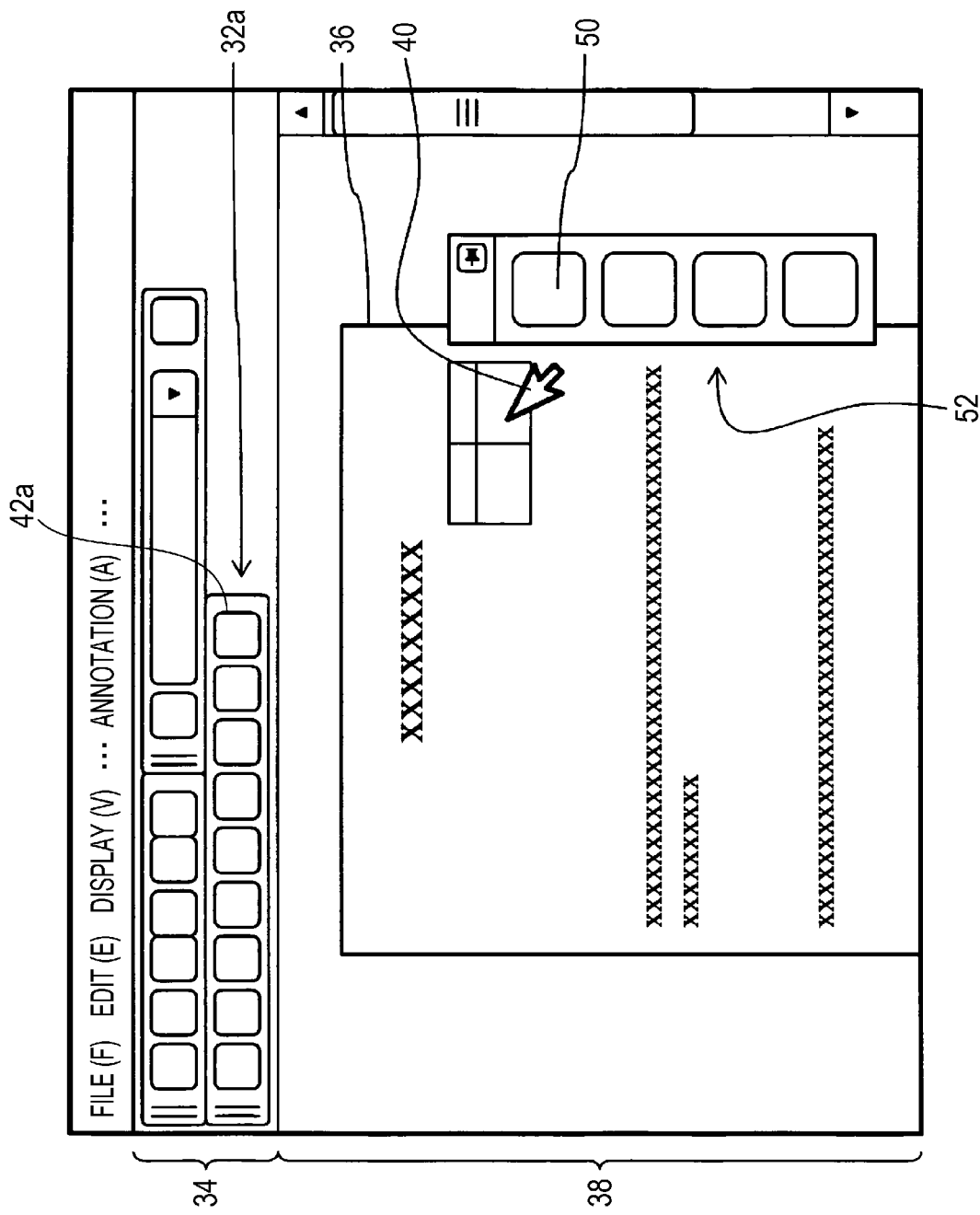
FIG. 3 is a diagram illustrating a state in which a plurality of recent instruction input buttons are displayed.

FIG. 3 is a diagram illustrating a state in which a plurality of recent instruction input buttons 50 are displayed. In this exemplary embodiment, the plurality of recent instruction input buttons 50 that are allocated a plurality of annotation adding instructions that the document processing application 14 has recently received from a user may be displayed on a display screen. A plurality of (in this example, N) recently received annotation adding instructions include, with reference to the current point in time, the last N annotation adding instructions. Although not illustrated in FIG. 3, the recent instruction input buttons 50 are provided with icons (designs) indicating corresponding annotations.

In this exemplary embodiment, the plurality of recent instruction input buttons 50 are displayed in the document display region 38. More particularly, a tool box 52 including the plurality of recent instruction input buttons 50 is displayed in the document display region 38. To add an annotation to the electronic document 36, a position to which the annotation is to be added needs to be specified in the document display region 38. However, by displaying the plurality of recent instruction input buttons 50 in the document display region 38, the amount of movement of the cursor 40 required to add the annotation may be reduced by using a recent instruction input button 50. The plurality of recent instruction input buttons 50 may be displayed at different positions. For example, the tool bar 32 including the plurality of recent instruction input buttons 50 may be displayed in the tool bar region 34.

When the document processing application 14 receives a new annotation adding instruction from the user, the button update unit 22 performs button update processing for updating an annotation adding instruction that is allocated to one of the plurality of recent instruction input buttons 50 to the newly received annotation adding instruction. More particularly, the button update unit 22 deletes the recent instruction input button 50 that is allocated the oldest annotation adding instruction from among the plurality of recent instruction input buttons 50, and adds the new recent instruction input button 50 that is allocated the newly received allocation adding instruction.

In this exemplary embodiment, in order to avoid a plurality of same annotation adding instructions from being allocated to the plurality of recent instruction input buttons 50, in the case where it is determined that the same type of annotations are received consecutively, the button update unit 22 does not perform the button update processing. That is, in the case where it is determined that annotation adding instructions for adding the same type of annotations are received consecutively, the plurality of annotation adding instructions allocated to the plurality of recent instruction input buttons 50 are kept as they are.

The button update unit 22 may determine, using a plurality of determination methods, that annotation adding instructions for adding the same type of annotations are received consecutively.

As a first determination method, a determination method based on an operation mode of the document processing application 14 selected by the mode selection unit 24 may be used. The mode selection unit 24 is able to select between a one-time addition mode and a consecutive addition mode, as an operation mode, in particular, an annotation addition mode regarding processing for adding an annotation, of the document processing application 14.

The one-time addition mode is a mode in which after a user selects an annotation addition button 42a or a recent instruction input button 50, specifies a position to which a corresponding annotation is to be added, and adds the corresponding annotation to the electronic document 36, a state in which the annotation addition button 42a or the recent instruction input button 50 is selected (that is, a state in which specification of a position to which the corresponding annotation is to be added is waited) is released. In the one-time addition mode, even in the case where the same type of annotations are consecutively added to the electronic document 36, a user needs to select the annotation addition button 42a or the recent instruction input button 50 after the last annotation is added.

The consecutive addition mode is a mode in which after a user selects an annotation addition button 42a or a recent instruction input button 50, specifies a position to which a corresponding annotation is to be added, and adds the corresponding annotation to the electronic document 36, a state in which the annotation addition button 42a or the recent instruction input button 50 is selected (that is, a state in which specification of a position to which the corresponding annotation is to be added is waited) is maintained. That is, the consecutive addition mode is a mode in which the same type of annotations may be consecutively added to the electronic document 36 without selection of the annotation addition button 42a or the recent instruction input button 50 being required.

Figure 4:
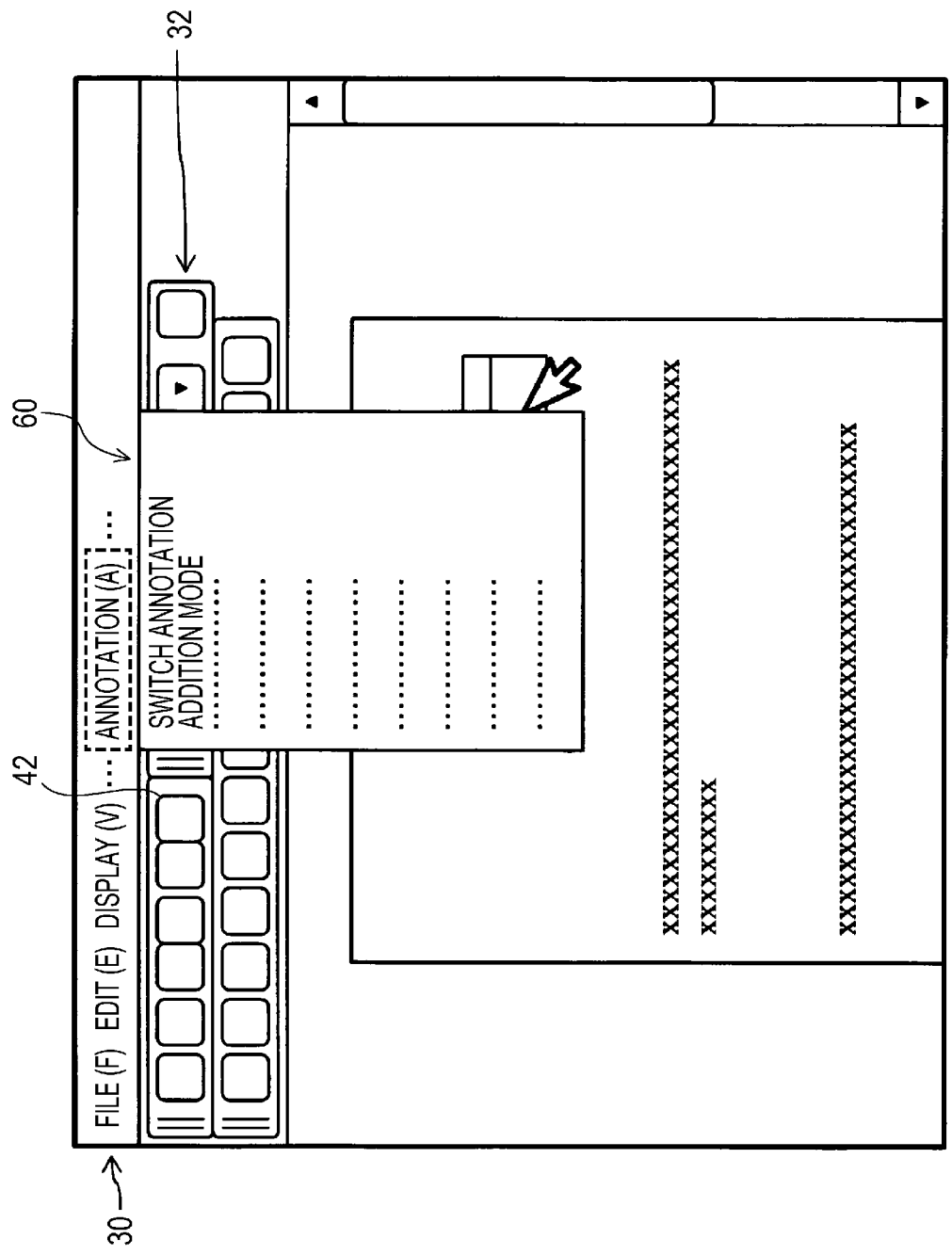
FIG. 4 is a diagram illustrating a state in which a drop-down list of a large item "annotation" is displayed.

The mode selection unit 24 selects the one-time addition mode or the consecutive addition mode in accordance with an instruction from a user. For example, as illustrated in FIG. 4, when the user selects a large item "annotation" from the menu bar 30, causes a drop-down list 60 for the large item "annotation" to be displayed, and selects a switching button for an annotation addition mode included in the drop-down list 60, the mode selection unit 24 switches between the one-time addition mode and the consecutive addition mode. Alternatively, the button 42 that is allocated an annotation addition mode switching instruction may be included in any one of the tool bars 32, and when the user selects the corresponding button 42, the mode selection unit 24 may switch between the one-time addition mode and the consecutive addition mode.

The consecutive addition mode is an operation mode for consecutively adding the same type of annotations. Therefore, in the case where the consecutive addition mode is selected, the button update unit 22 determines that annotation adding instructions for adding the same type of annotations are consecutively received. Thus, in the case where the consecutive addition mode is selected, the button update unit 22 does not perform updating processing for the recent instruction input buttons 50. In contrast, in the case where the one-time addition mode is selected, the button update unit 22 performs update processing for the recent instruction input buttons 50 when the annotation adding instruction is received.

The mode selection unit 24 is able to set an annotation addition mode for each type of annotation. FIG. 5 illustrates the details of the annotation tool bar 32*a*. In this exemplary embodiment, when a user double-clicks any one of the annotation addition buttons 42*a* included in the annotation tool bar 32*a*, the mode selection unit 24 switches between the one-time addition mode and the consecutive addition mode, only for the addition mode of the annotation allocated to the double-clicked annotation addition button 42*a*. Accordingly, the mode selection unit 24 is able to individually set a consecutive addition mode for each type of annotation.

In the case where a consecutive addition mode is individually set for each type of annotation, when an annotation adding instruction for adding an annotation for which the consecutive addition mode is set is received, the button update unit 22 determines that annotation adding instructions for adding the same type of annotations are received consecutively, and thus does not perform update processing for the recent instruction input buttons 50. In contrast, in the case where an annotation adding instruction for adding an annotation for which the consecutive addition mode is not set (that is, the one-time addition mode is set) is received, the button update unit 22 performs update processing for the recent instruction input buttons 50.

As the second determination method, a method in which the button update unit 22 compares the type of the last added annotation (hereinafter, referred to as a "last annotation type") with the type of the currently added annotation (hereinafter, referred to as a "current annotation type") and actually determines whether or not these types are the same may be used. In the case where the last annotation type and the current annotation type are the same, the button update unit 22 does not perform update processing for the recent instruction input buttons 50. In the case where the last annotation type and the current annotation type are not the same, the button update unit 22 performs update processing for the recent instruction input buttons 50.

As a method for determining whether or not the last annotation type and the current annotation type are the same, for example, the button update unit 22 may temporarily store information indicating the last annotation type when the last annotation adding instruction is received and compare the information indicating the last annotation type that is temporarily stored in the memory 12 with the current annotation type when the current annotation adding instruction is received.

Specifically, as illustrated in FIG. 6, an identifier (in the example of FIG. 6, a number) for uniquely identifying an annotation addition button 42*a* is set in advance for each of the annotation addition buttons 42*a* included in the annotation tool bar 32*a*. Then, when the last annotation adding instruction is received, the button update unit 22 causes an identifier corresponding to the selected annotation addition button 42*a* to be temporarily stored in the memory 12. After that, when the current annotation adding instruction is received, the button update unit 22 compares the identifier corresponding to the selected annotation addition button 42*a* with the identifier temporarily stored in the memory 12. In the case where these identifiers are the same, the button update unit 22 determines that the same type of annotations are consecutively added. In the case where these identifiers are not the same, the button update unit 22 determines that the same type of annotations are not added consecutively.

Furthermore, in the second determination method, in the case where the last annotation type and the current annotation type are the same and an attribute of the last added annotation (hereinafter, referred to as a "last annotation attribute") and an attribute of the current added annotation (hereinafter, referred to as a "current annotation attribute") are the same, the button update unit 22 may not perform update processing for the recent instruction input buttons 50, and in the case where the last annotation type and the current annotation type are not the same or the last annotation attribute and the current annotation attribute are not the same, the button update unit 22 may perform update processing for the recent instruction input buttons 50. In other words, in the case where annotation adding instructions for adding the same type of annotations with the same attributes are received consecutively, the button update unit 22 may not perform update processing for the recent instruction input buttons 50.

Examples of attributes of an annotation will be described below. Attributes of a text annotation include, for example, a font, a color, a size, text decoration (a strikethrough, an underline, etc.), and the like. Furthermore, attributes of a graphic annotation include, for example, presence or absence of a line, the color of a line, the thickness of a line, application or non-application of fill color, the color of color filling, the width, the height, the rotation angle, and the like. Obviously, other types of annotations (marker annotations, label annotations, etc.) include a plurality of attributes. Some annotations may have no attributes.

In general, each annotation have a plurality of attributes. In the case where the last annotation type and the current annotation type are the same and a plurality of last annotation attributes and a plurality of current annotation attributes partially match, the button update unit 22 may not perform update processing for the recent instruction input buttons 50, and in the case where the past annotation type and the current annotation type are the same and a plurality of last annotation attributes and a plurality of current annotation attributes completely match, the button update unit 22 may not perform update processing for the recent instruction input buttons 50.

The button update unit 22 may adopt a determination method of a combination of the first determination method and the second determination method described above. That is, in the case where the consecutive addition mode is selected, the button update unit 22 may not perform update processing for the recent instruction input buttons 50, and in the case where the one-time addition mode is selected, in accordance with the second determination method described above, when the last annotation type and the current annotation type are the same (or the last annotation attribute and the current annotation attribute may be taken into consideration), the button update unit 22 may not perform update processing for the recent instruction input buttons 50, and when the last annotation type and the current annotation type are not the same, the button update unit 22 may perform update processing for the recent instruction input buttons 50.

As described above, in the document processing application 14 according to this exemplary embodiment, in the case where it is determined that annotation adding instructions for adding the same type of annotations are consecutively received, the button update unit 22 does not perform update processing for the recent instruction input buttons 50. Therefore, a plurality of same annotation adding instructions are avoided from being allocated to a plurality of recent instruction input buttons 50. Accordingly, even after the same type of annotations are added, a user is able to easily perform an operation for selecting and adding a desired annotation from among a plurality of types of recently input annotations, using the plurality of recent instruction input buttons 50.

Figure 7:
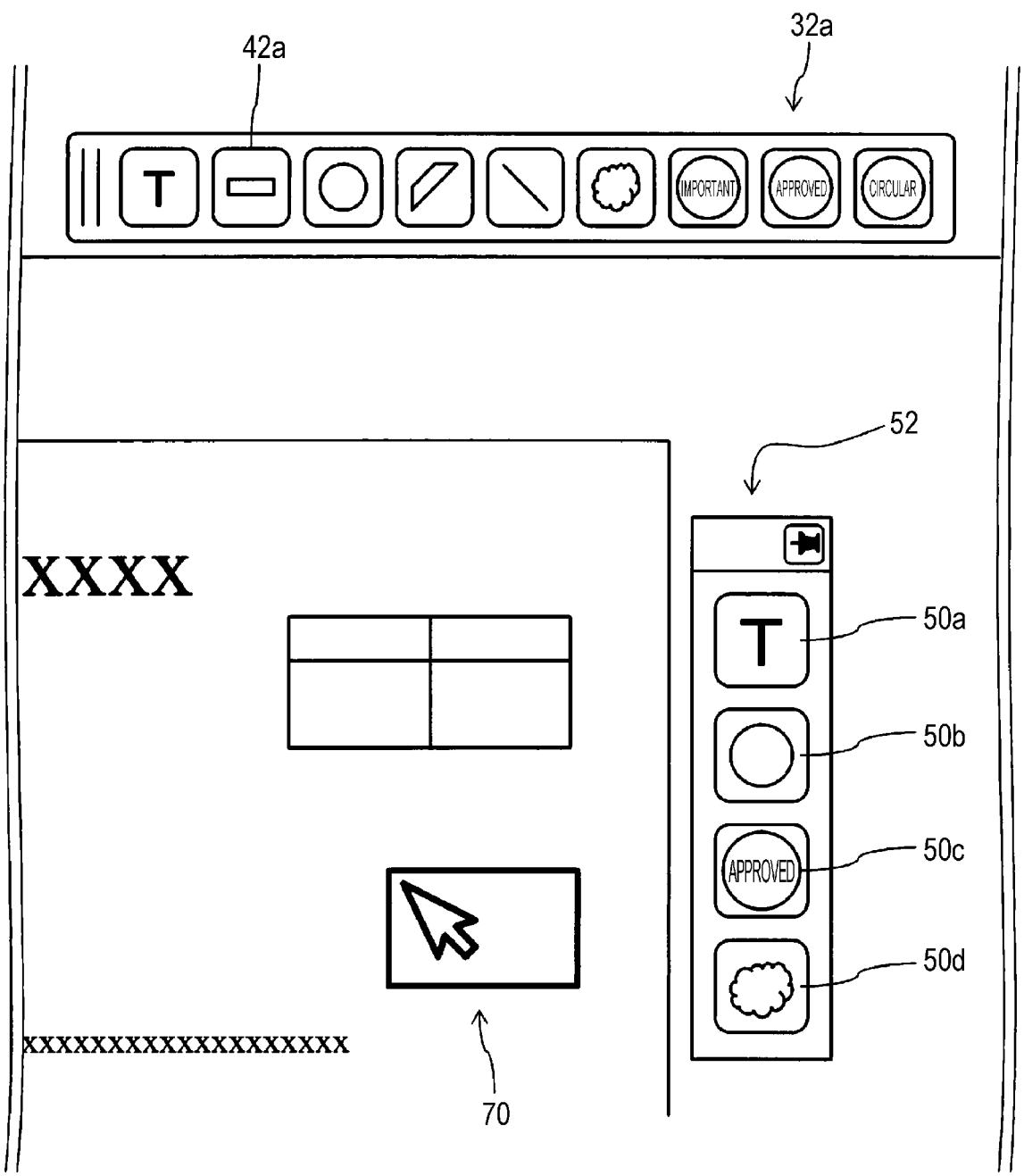
FIG. 7 is a diagram illustrating a state in which recent instruction input buttons are not updated.

FIG. 7 illustrates a state in which when an annotation adding instruction is input by a user, the recent instruction input buttons 50 are not updated. The tool box 52 includes a recent instruction input button 50*a* that is allocated an annotation input instruction for a text annotation, a recent instruction input button 50*b* that is allocated an annotation input instruction for a circular annotation, a recent instruction input button 50*c* that is allocated an annotation input instruction for an approval stamp annotation, and a recent instruction input button 50*d* that is allocated an annotation input instruction for a cloud-shape annotation. It is assumed that the recent instruction input button 50*a* that is allocated an annotation input instruction for a text annotation is the oldest button added to the tool box 52, among the recent instruction input buttons 50*a* to 50*d*.

In this state, in the case where the user selects the consecutive addition mode, even when the annotation addition button 42*a* that is allocated an annotation input instruction for a rectangular annotation included in the annotation tool bar 32*a* is selected and a rectangular annotation 70 is added to the electronic document 36, the button update unit 22 does not perform update processing for the plurality of recent instruction input buttons 50. Therefore, the plurality of recent instruction input buttons 50 maintain the same state as before the rectangular annotation 70 is added, as illustrated in FIG. 7.

Figure 8:
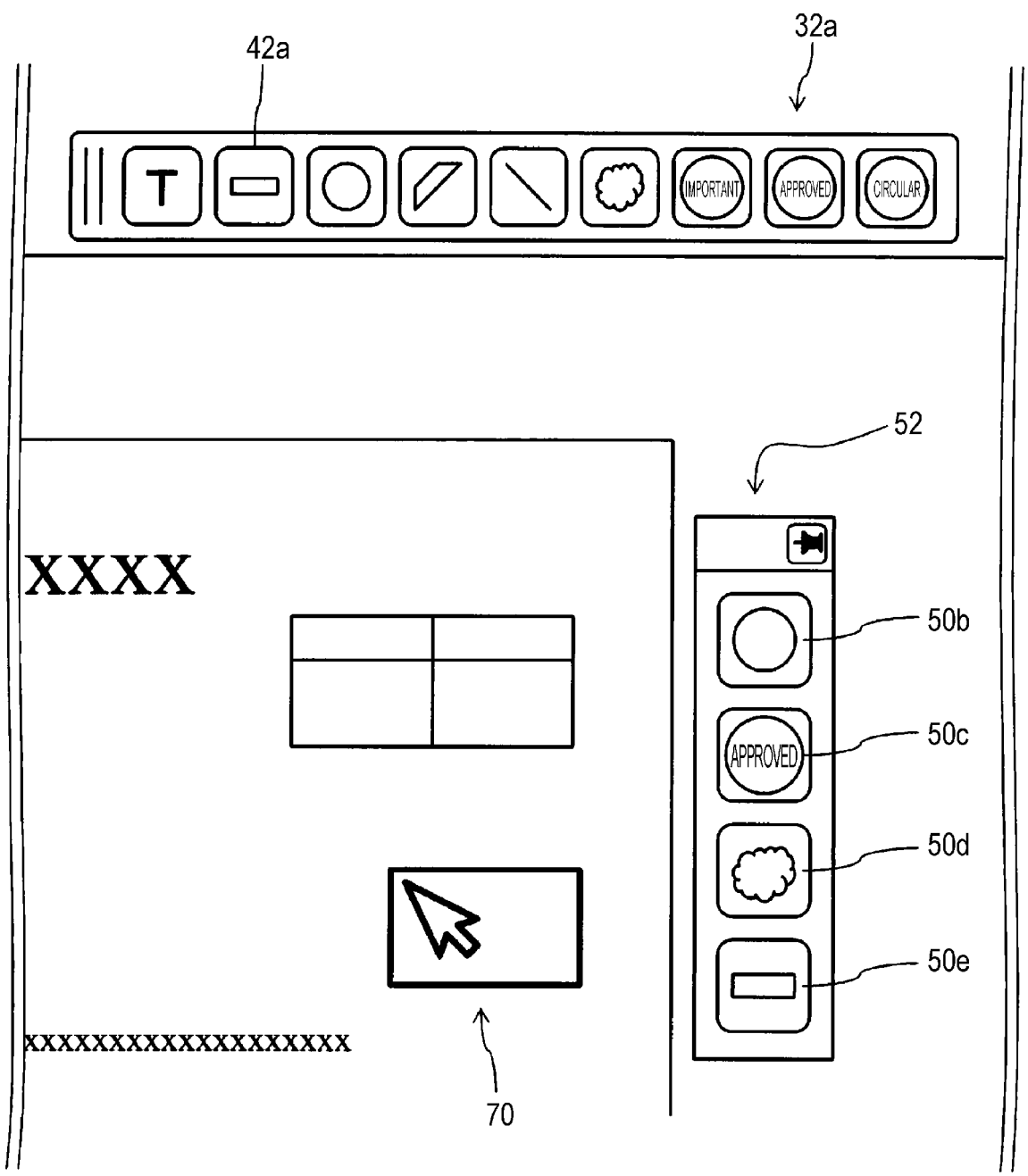
FIG. 8 is a diagram illustrating a state in which recent instruction input buttons are updated.

In contrast, FIG. 8 illustrates a state in which when an annotation adding instruction is input by a user, the recent instruction input buttons 50 are updated. With the plurality of recent instruction input buttons 50 in the state illustrated in FIG. 7, in the case where the user selects the one-time addition mode, when the user adds the rectangular annotation 70 to the electronic document 36, the button update unit 22 performs update processing for the recent instruction input buttons 50. As a result, the recent instruction input button 50*a*, which is the oldest button added to the tool box 52, is deleted, and the recent instruction input button 50*e* that is allocated an annotation input instruction for the currently input rectangular annotation 70 is added to the tool box 52. In accordance with addition of the recent instruction input button 50*e*, the positions of the recent instruction input buttons 50*b* to 50*d* are moved upward.

Figure 9:
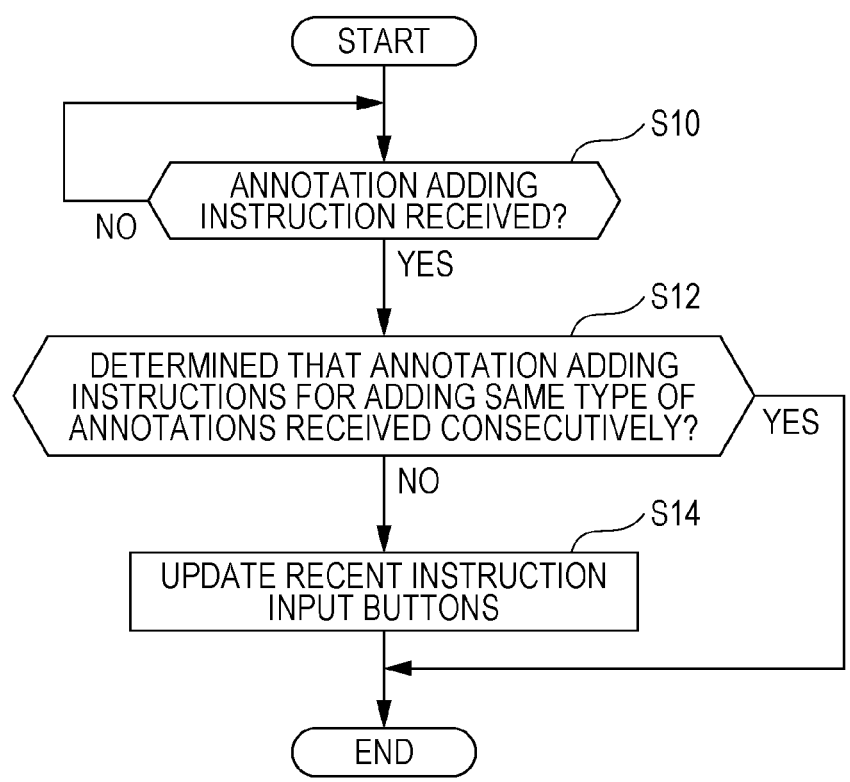
FIG. 9 is a flowchart illustrating the flow of a process of a document processing apparatus according to an exemplary embodiment.

The flow of a process of the document processing apparatus 10 will be explained below with reference to a flowchart illustrated in FIG. 9.

In step S10, the button update unit 22 determines whether or not an annotation adding instruction is received from a user. The button update unit 22 waits until an annotation adding instruction is received from a user, and in the meantime, the controller 20 performs processing in accordance with another instruction from a user. When an annotation adding instruction is received from a user, the process proceeds to step S12.

In step S12, the button update unit 22 determines whether or not it is determined that annotation adding instructions for adding the same type of annotations are received consecutively. Specifically, the determination is made by the first determination method described above, the second determination method described above, or a combination of the first determination method and the second determination method.

In the case where it is determined that annotation adding instructions for adding the same type of annotations are received consecutively, the process is terminated without the processing of step S14 being performed. In the case where it is determined that annotation adding instructions for adding the same type of annotations are not received consecutively, the process proceeds to step S14, and the button update unit 22 performs update processing for the recent instruction input buttons 50 in step S14.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A document processing apparatus comprising:
a display controller that displays an electronic document, a first tool bar, and a second tool bar, wherein the first tool bar comprises a plurality of first buttons, wherein the second tool bar comprises a plurality of second buttons that are allocated a plurality of instructions for adding an object to the electronic document, and wherein the plurality of instructions have been recently received from a user by selecting a plurality of the first buttons from the first tool bar; and
a processor updates the second tool bar, such that a first instruction allocated to one of the plurality of second buttons is updated to second instruction allocated to one of the plurality of first buttons, wherein the second instruction is a newly received instruction after the first instruction,
wherein in a case where the second instruction and a third instruction are received consecutively, and the second instruction and the third instruction are adding a same type of objects to the electronic document, the processor does not update the second tool bar.

2. The document processing apparatus according to claim 1, wherein the processor is further configured to:
select a consecutive addition mode in which a same type of objects are able to be added consecutively to the electronic document,
wherein in a case where the consecutive addition mode is selected, the processor does not update the second tool bar.

3. The document processing apparatus according to claim 2, wherein the processor is capable of individually setting the consecutive addition mode for each type of object.

4. The document processing apparatus according to claim 1, wherein in a case where instructions for adding a same type of objects with a same attribute are received consecutively, the processor does not update the second tool bar.

5. A document processing apparatus comprising:
display control means for displaying an electronic document, a first tool bar, and a second tool bar, wherein the first tool bar comprises a plurality of first buttons, wherein the second tool bar comprises a plurality of second buttons that are allocated a plurality of instructions for adding an object to the electronic document, and wherein the plurality of instructions have been recently received from a user by selecting a plurality of the first buttons from the first tool bar; and button update means for updating the second tool bar, such that a first instruction allocated to one of the plurality of second buttons is updated to a second instruction allocated to one of the plurality of first buttons, wherein the second instruction is a newly received instruction after the first instruction, wherein in a case where the second instruction and a third instruction are received consecutively, and the second instruction and the third instruction are adding a same type of objects to the electronic document, the button update means does not update the second tool bar.

6. A non-transitory computer readable medium storing a program causing a computer to execute a process for document processing, the process comprising:

displaying an electronic document, a first tool bar, and a second tool bar, wherein the first tool bar comprises a plurality of first buttons, wherein the second tool bar comprises a plurality of second buttons that are allocated a plurality of instructions for adding an object to the electronic document, and wherein the plurality of instructions have been recently received from a user by selecting a plurality of the first buttons from the first tool bar; and the second tool bar, such that a first instruction allocated to one of the plurality of second buttons is updated to a second instruction allocated to one of the plurality of first buttons, wherein the second instruction is a newly received instruction after the first instruction, wherein in a case where the second instruction and a third instruction are received consecutively, and the second instruction and the third instruction are adding a same type of objects to the electronic document, the button update processing does not update the second tool bar.

* * * * *